United States Patent
Cipollone

(10) Patent No.: US 9,811,815 B2
(45) Date of Patent: Nov. 7, 2017

(54) DYNAMIC REPLACEMENT OF SELF-SERVICE TERMINAL (SST) STATES FLOW AND SCREENS HANDLING

(71) Applicant: NCR Corporation, Duluth, GA (US)

(72) Inventor: Stefano Cipollone, Milan (IT)

(73) Assignee: NCR Corporation, Duluth, GA (US)

( * ) Notice: Subject to any disclaimer, the term of this patent is extended or adjusted under 35 U.S.C. 154(b) by 456 days.

(21) Appl. No.: 14/510,642

(22) Filed: Oct. 9, 2014

(65) Prior Publication Data

US 2016/0104139 A1    Apr. 14, 2016

(51) Int. Cl.
G06Q 40/00 (2012.01)
G06Q 20/18 (2012.01)
G06F 9/44 (2006.01)
G07F 19/00 (2006.01)
G07G 1/00 (2006.01)

(52) U.S. Cl.
CPC ........... *G06Q 20/18* (2013.01); *G06F 9/4416* (2013.01); *G07F 19/206* (2013.01); *G07G 1/0009* (2013.01)

(58) Field of Classification Search
USPC ............................................ 235/379; 705/43
See application file for complete search history.

(56) References Cited

U.S. PATENT DOCUMENTS

| | | | |
|---|---|---|---|
| 7,051,096 B1 * | 5/2006 | Krawiec | G07F 19/20 235/379 |
| 8,090,804 B2 | 1/2012 | Obara et al. | |
| 8,738,528 B2 * | 5/2014 | Vesely | G06F 3/048 705/43 |
| 2001/0029490 A1 | 10/2001 | Inamochi | |
| 2003/0066876 A1 * | 4/2003 | Goldman | G06Q 20/4014 235/379 |
| 2012/0005586 A1 | 1/2012 | Uola et al. | |
| 2015/0249667 A1 * | 9/2015 | Han | H04L 63/10 726/4 |

FOREIGN PATENT DOCUMENTS

| | | |
|---|---|---|
| EP | 0961251 | 12/1999 |
| EP | 1096447 | 5/2001 |
| WO | 00/49547 | 8/2000 |

OTHER PUBLICATIONS

European Search Report issued in co-pending in European patent application 15187867.5 dated Jan. 15, 2016.

* cited by examiner

*Primary Examiner* — Ahshik Kim
(74) *Attorney, Agent, or Firm* — Schwegman, Lundberg & Woessner

(57) ABSTRACT

A state-driven Self-Service Terminal (SST) has its existing state table dynamically and transparently replaced. The states flow, the screens rendered during the flows, and the state transitions are handled by an enhanced module processing on the SST. The enhanced module references existing state code on the SST so that the SST continues to operate in a manner expected, but enhanced functionality and features are provided to the SST through the enhanced module and the replaced state table.

17 Claims, 5 Drawing Sheets

DYNAMIC REPLACEMENT OF SELF-SERVICE TERMINAL (SST) STATES FLOW AND SCREENS HANDLING

BACKGROUND

Many Automated Teller Machines (ATMs) behave like a state machine. When an ATM boots up, or with even lesser frequency, the ATM contacts a remote server and downloads state tables defining states, process flows, state transitions, and screen identifiers for screens to render on the display of the ATM. The state tables drive the processing at the ATM, identifying which process flows to execute, which events trigger a state transition, and what screens to render on the ATM display during a state or process flow.

The benefit of this approach is there is uniformity across a bank's (or financial institution) set of ATMs and problems may be able to be fixed or new functionality be provided only with updates to the state table at the remote host. The approach provides centralized control and uniformity across large sets of ATMs.

The problem with this approach is that it is time consuming and complex to change the flow that executes the states on the ATM, because the flow and states are not optimized. Furthermore, the infrastructure is not open to the use of new rendering technologies or the use of new flow building technologies. Essentially, the two main issues with the current models are: current flow structure is not optimized and it is cumbersome to create a flow using the existing model, and the technology used for both the flow and the screen rendering is dated and is not open to accommodate the new capabilities provided by web technology.

Basically, utilization of a state-driven ATM is still very useful but lacks an ability to customize an ATM in an equivalent manner so that it maintains the functionality of the original state table approach but can provide improved interfaces and functionality in a customized manner to a particular ATM or set of ATMs in the ATM network.

Therefore, it is desirable to provide improved mechanisms to configure state-driven machines without altering the standard functionality that the state-driven ATM provide with their existing states and without altering the authorization process currently used by the Bank or Financial Institution.

SUMMARY

In various embodiments, methods and a Self-Service Terminal (SST) for providing dynamic replacement of SST states flow and screens handling are presented.

According to an embodiment, a method for providing dynamic replacement of SST states flow and screens handling is presented. Specifically, and in an embodiment, a replacement states flow for an existing states table of a Self-Service Terminal (SST) is dynamically and transparently obtained. Next, this replacement states flow is processed on the SST.

DETAILED DESCRIPTION

Figure 1A:
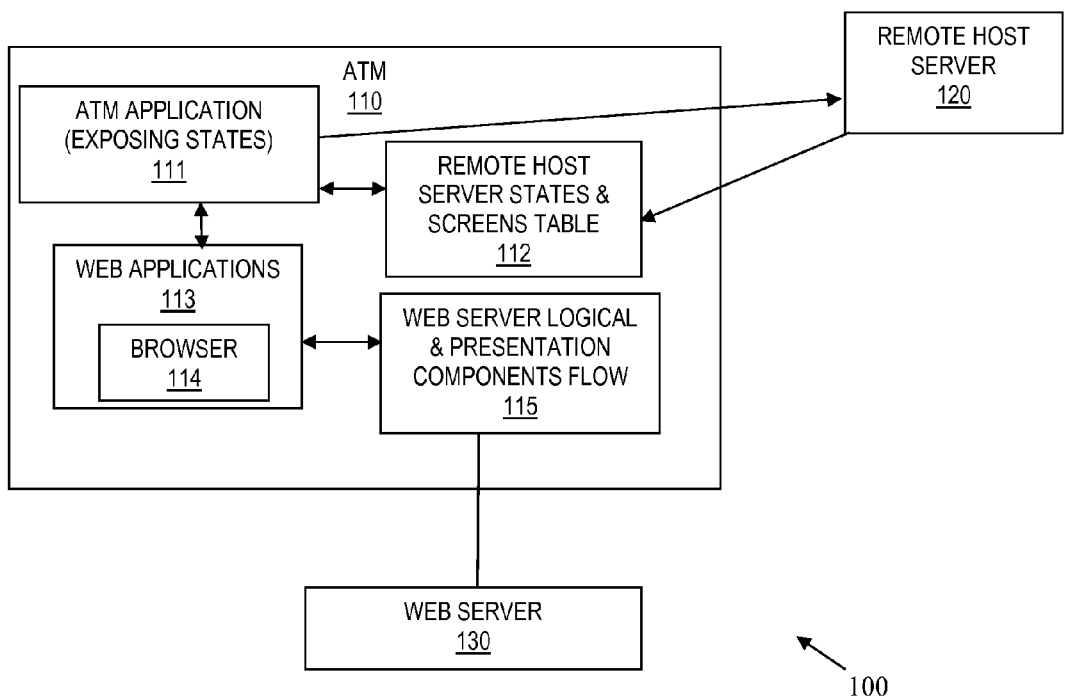
FIG. 1A is a diagram of a dynamic replacement Self-Service Terminal (SST) states flow and screens handling system, according to an example embodiment.

FIG. 1A is a diagram of a dynamic replacement Self-Service Terminal (SST) processing system 100, according to an example embodiment. It is to be noted that the components are shown schematically in greatly simplified form, with only those components relevant to understanding of the embodiments being illustrated.

Furthermore, the various components (that are identified in the FIG. 1A) are illustrated and the arrangement of the components is presented for purposes of illustration only. It is to be noted that other arrangements with more or less components are possible without departing from the teachings of dynamic replacement of SST processing, presented herein and below.

The dynamic replacement SST system 100 includes an ATM 110 (one type of SST), a remote host server 120, and a web server 130. The ATM 110 includes an ATM application 111 (which can be considered a collection of states that can be executed and hence exposed for leveraging), a remote host server states & screens table 112, and web applications or components 113. The web applications or components 113 (referred to as "web applications 113" hereinafter) include a browser 114.

During operation of the dynamic replacement SST system 100, the ATM 110 boots up or comes online. The ATM application 111 is a core driving application on the ATM 110. The ATM application 111 is designed on boot up (or with some other configured frequency) to contact the remote host server 120 to request the remote host server states & screens table 112. The remote host server 120 downloads the remote host server states & screens table 112 to the ATM 110.

The state table provides identifiers for other resources that are pre-installed on the ATM 110 in a table format that is event driven. The identifiers include such things as processing flow within a given state, events identifiers to trigger a state change, screen identifiers for rendering screens to the display of the ATM 110 and the like.

In a typical scenario when remote host server states & screens table 112 is downloaded, the ATM application 111 would call or reference an address associated with the state driver or an initial state to begin the state-driven processing defined by the remote host server states & screens table 112.

However, with the embodiments discussed herein this is altered and enhanced such that the address expected by the ATM application 111 to be the initial state or the state driver is the address of the web browser 114. The web browser 114 upon receiving the call or reference from the ATM application 111 contacts the web server 130, which triggers the web server 130 to download the web server logical & presentation components flow 115 and execute a flow that uses logical and presentation components making use of the states exposed by the ATM application 111.

It is noted that the ATM application 111 is not modified and operates normally, the ATM application 111 believes that it called and is using the remote host server states & screens table 112 when in fact the ATM application 111 is actually using the web server flow (making use of the state exposed by the ATM application 111) and being driven by or serviced by the web applications 113 and the web browser 114.

It is noted that the core functionality of the states and data expected by the states and the transactional communications expected by the remote host server 120 from the states are unchanged (existing ATM states code remains the same). The remote host server 120 therefore believes that it is communicating with the remote host server states & screens table 112 related processing when in fact the remote host server 120 is communicating with the web server logical & presentation components flow 115. By maintaining a consistent interface and states and state transitions in the web server logical & presentation components flow 115, the remote host server 120 and the ATM application 111 can continue to process without failure or breakage occurring as they have been doing using the remote hose server state table 112.

However, the web server logical & presentation components flow 115 is serviced by the web applications 113 and the browser 114 and can include improved flows within a state and improved screens. For example, screens can be defined as resource files as browser-compatible languages, such as Hyper Text Markup Language (HTML), eXtensible Markup Language (XML), and the like. The web applications 113 can include JAVA™ programs or other web compatible programs to provide other features, such as video within a web page rendered as a screen on the display through the web browser 114, dynamically translating the content of a screen from one spoken language to another spoken language, and the like.

So, content rich displays and features available in a web-based environment can be provided through the web server logical & presentation components flow 115, the browser 114, and the web applications 113. Components (web applications) referenced within the rendered pages of the browser 114 can be used to trigger the proper execution of the states, which continue to execute on the ATM 110 normally and which, when required, communicate with the remote host server 120 for transaction-related purposes.

Conventionally, states code are executable modules of the ATM application 111 that were directly called from the remote host server table 112 (via a state driver or flows downloaded from the remote host server table 112). This is now changed, such that the states code remain as executable modules of the ATM application 111 but are called for execution by the component defined in the new web-based flows that are defined in the web server logical & presentation components flow 115. So, state execution remains unchanged but the flows that call the states of the ATM application 111 now come from the components of the new web-based flows defined in the web server logical & presentation components flow 115.

The web browser 114 executes the web based flows and utilizes the web applications 113 to provide enhanced processing, enhanced screen rendering (web-rich content), and to call the ATM application 111 states code when needed based on state transitions defined in the web server logical & presentation components flow 115.

In the same manner, web-based flows that need to render a screen to the display of the ATM 110 will access web-encoded data to render those screens to the display.

The customer ends up interacting with a browser interface and experiences web-rich content that can be customized for particular ATMs or sets of ATMs without breaking the normal manner in which the ATM 110 operates and needs to interact with the ATM peripherals (receipt printer, case dispenser, currency acceptor, encrypted keypad, touch-screen, etc.) and without breaking the manner in which the ATM needs to continue to interact with the remote host server 120 (for account verification, withdrawal authorization, etc.).

Essentially, the ATM 110 remains a state-driven machine and is unaware that it has been enhanced with a customized and new states flow and customized screens within the new states flow; all of which is now being handled by the browser 114, the web applications 113, and the connection server state table 115.

This arrangement provides for a variety of customized improvements with no detrimental impact to the bank.

Figure 1B:
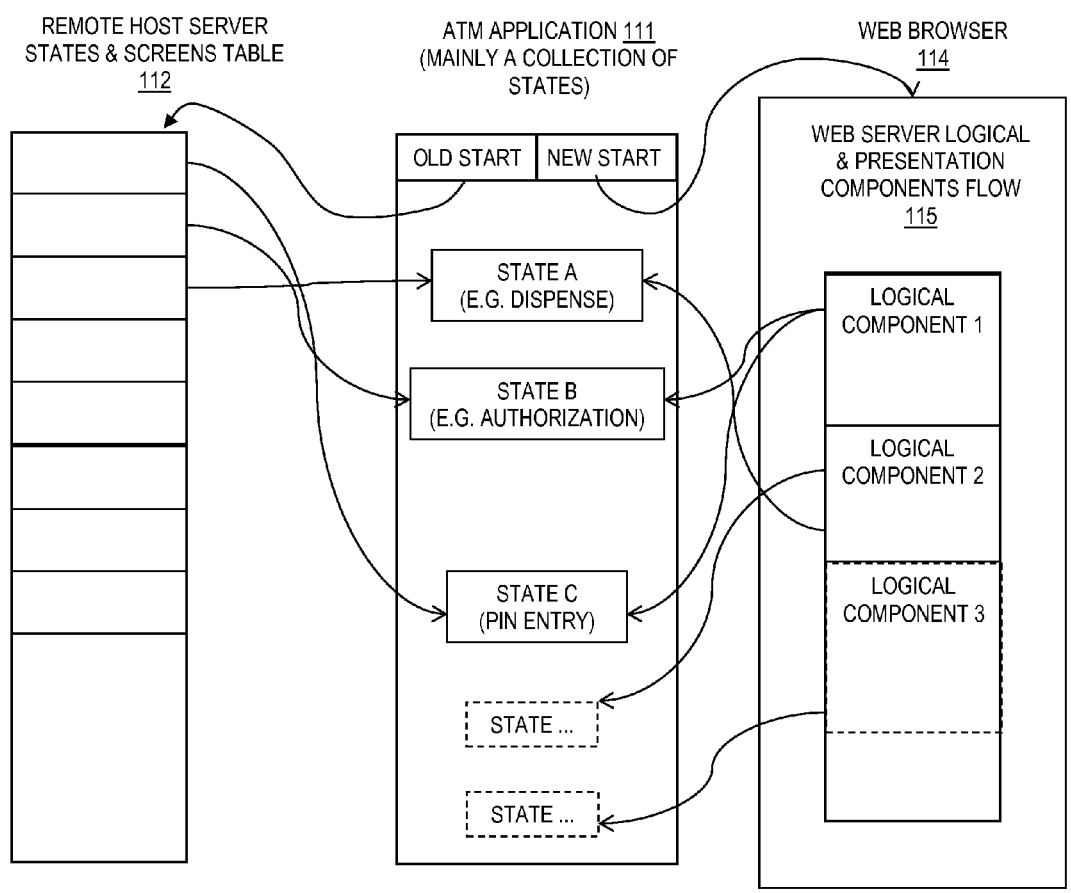
FIG. 1B is an example diagram depicting the interaction with the enhanced states flow as discussed in the FIG. 1A, according to an example embodiment.

FIG. 1B is a diagram depicting the interaction with the enhanced states flow as discussed in the FIG. 1A, according to an example embodiment.

The diagram in FIG. 1B illustrates the remote host server states & screens table 112, the ATM application 111, and the web browser 114 using the webserver logical & presentation components flow 115.

Notice that the new web flow (illustrated in FIG. 1B as the web server logical & presentation components flow 115) is simpler and there is not a one-to-one mapping between flow entries and states, such that each logical component flow may call more than one states exposed in the ATM application 111. This is not the case with the remote host server states and screens table 111, which does have a one-to-one mapping with the states of the ATM application 111.

It is to be noted that the remote host sever states & screens table 112 shown in the FIG. 1B is shown to compare with the newly proposed approach utilizing the web browser 114 to process the web server logical & presentation components flow, since in the proposed approach the remote host server states & screens table 112 is unused and unnecessary.

Some of embodiments of the FIG. 1A and other embodiments are now discussed with reference to the FIGS. 2-4.

Figure 2:
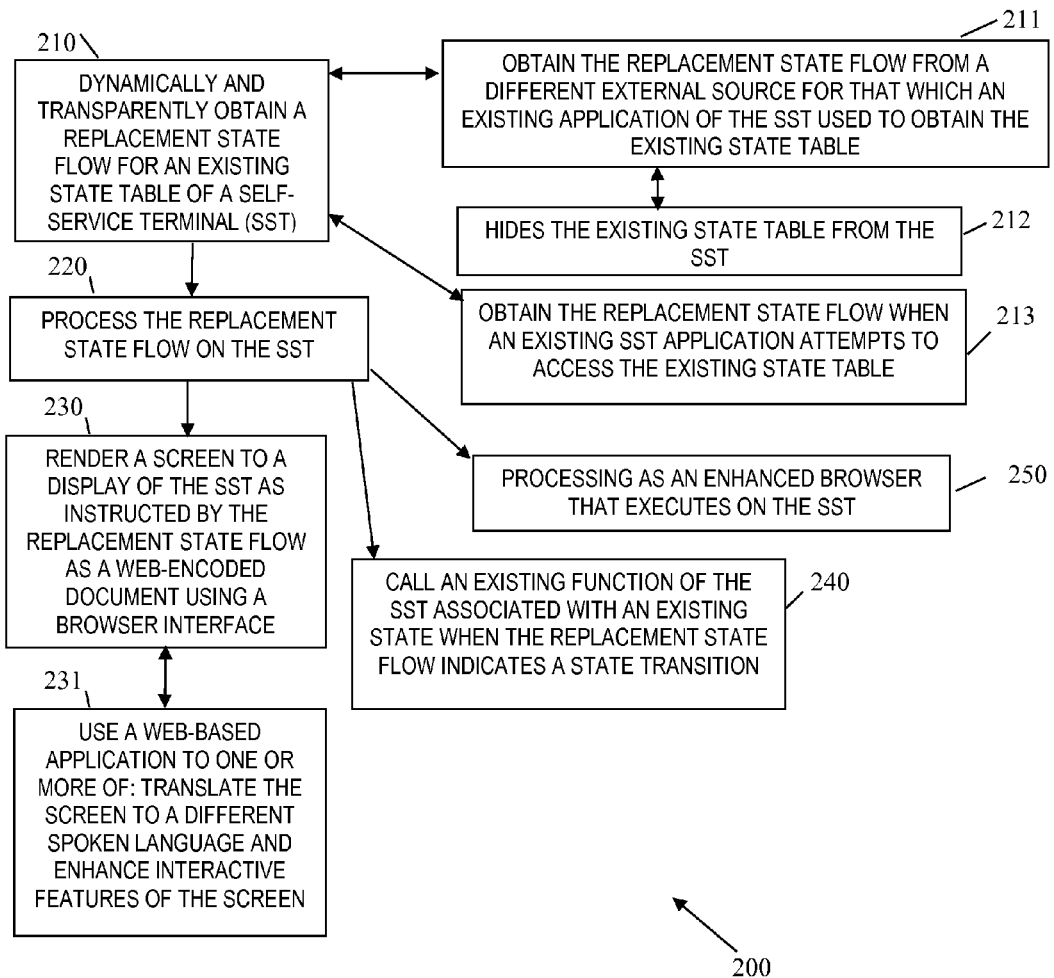
FIG. 2 is a diagram of a method for dynamic replacement of SST states flow and screens handling, according to an example embodiment.

FIG. 2 is a diagram of a method 200 for dynamic replacement of SST processing, according to an example embodiment. The software module(s) that implements the method 200 is referred to as a "SST state flow driver." The SST state flow driver is implemented as executable instructions programmed and residing within memory and/or a non-transitory computer-readable (processor-readable) storage medium and executed by one or more processors of a SST. The processor(s) of the SST that executes the SST state flow driver are specifically configured and programmed to process the SST state flow driver. The SST state flow driver has access to one or more network connections during its processing. The network connections can be wired, wireless, or a combination of wired and wireless.

In an embodiment, the SST is the ATM 100 of the FIG. 1A.

In an embodiment, the SST is a kiosk.

In an embodiment, the SST is a Self-Service Checkout Station.

In an embodiment, the SST is a Point-Of-Sale (POS) device.

In an embodiment, the SST state flow driver is the browser 114 and the web applications 113 of the FIG. 1A.

At 210, the SST state flow driver dynamically and transparently obtains a replacement state flow for an existing state table of the SST. This can be achieved when an existing application on the SST attempts to access the existing state table by configuring the SST state flow driver to be the address that the existing application expects the existing state table to be at. This can also be done via a proxy application that intercepts the call to the existing state table and redirects it to the SST state flow driver. Other techniques can be done as well to achieve transparency.

According to an embodiment, at 211, the SST state flow driver obtains the replacement state flow from a different external source for that which an existing application of the SST used to obtain the existing state table. This is similar to the discussion above where the ATM 100 acquired the remote host server states & screens table 112 from the remote host server 120 and the web browser 114 obtained the web server logical & presentation components flow 115 from the web server 130.

In an embodiment of 211 and at 212, the SST state flow driver hides the existing state table from the SST. This can be done to ensure the existing state table is not used for the SST.

In an embodiment, at 213, the SST state flow driver obtains the replacement state flow when an existing SST application attempts to access the existing state table. This was discussed above, either directly or using a proxy type application on the SST to intercept and re-route the request to SST state flow driver and the SST state flow driver obtains the replacement state table.

At 220, the SST state flow driver processes the replacement state flow on the SST.

In an embodiment, at 230, the SST state flow driver renders a screen to a display of the SST as identified in the replacement state flow as a web-encoded document using a browser interface.

In an embodiment of 230 and at 231, the SST state flow driver uses a web-based application to one or more of: translate the screen to different spoken language and enhance interactive features of the screen.

According to an embodiment, at 240, the SST state flow driver calls an existing function of the SST associated with an existing state when the replacement state flow indicates a state transition. So, processing associated with an existing state (the existing function) remains unchanged although the flow is enhanced and replaced by the replacement state flow.

In an embodiment, at 250, the SST state flow driver is processed on the SST as an enhanced browser that executes on the SST.

Figure 3:
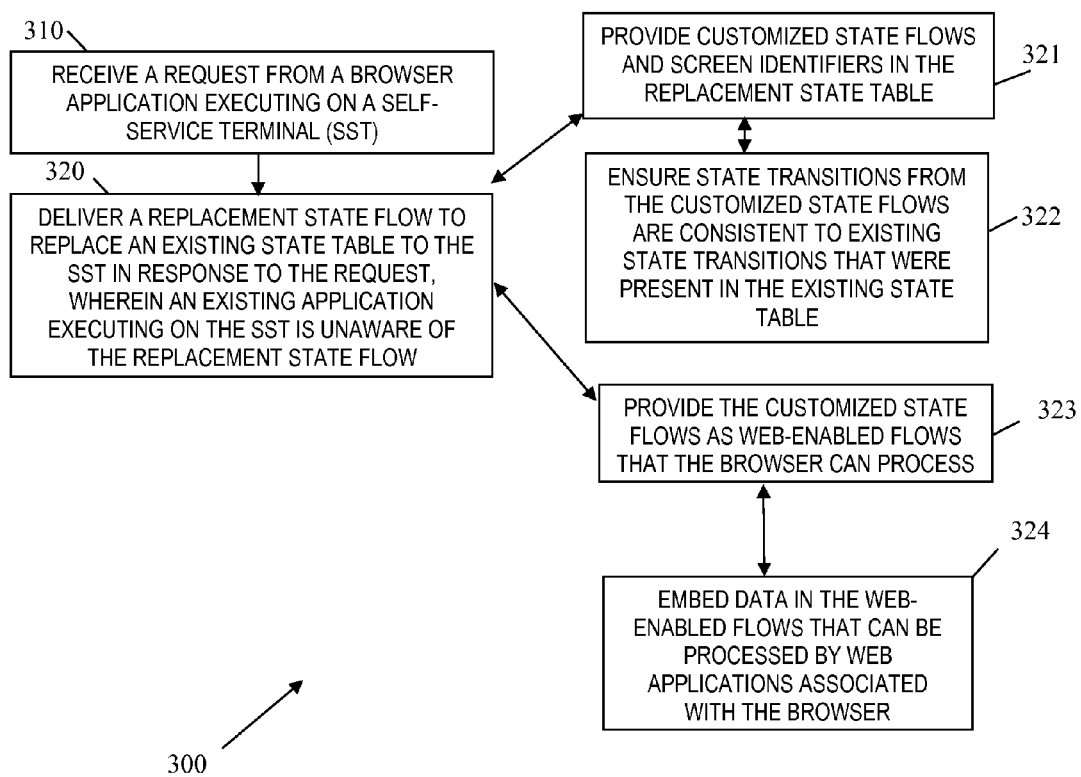
FIG. 3 is a diagram of another method for dynamic replacement of SST states flow and screens handling, according to an example embodiment.

FIG. 3 is a diagram of another method 300 for dynamic replacement of SST processing, according to an example embodiment. The software module(s) that implements the method 300 is referred to as a "state table manager." The state table manager is implemented as executable instructions programmed and residing within memory and/or a non-transitory computer-readable (processor-readable) storage medium and executed by one or more processors of a device. The processors that execute the state table manager are specifically configured and programmed to process the state table manager. The state table manager has access to one or more network connections during its processing. The network connections can be wired, wireless, or a combination of wired and wireless.

In an embodiment, the device that executes the state table manager is web server 130 of the FIG. 1A.

In an embodiment, the device that executes the state table manager is local to a facility having an SST (local server).

In an embodiment, the device that executes the state table manager is external and remote to a facility having an SST (remote server).

In an embodiment, the device that executes the state table manager is part of a cloud processing environment.

The state table manager interacts with the SST state flow driver of the FIG. 2 to provide an enhanced state table, such as the web server logical & presentation components flow 115 of the FIG. 1A.

At 310, the state table manager receives a request from a browser application executing on a SST.

At 320, the SST state flow driver delivers a replacement state flow to replace an existing state table to the SST in response to the request. The existing application executes on the SST and is unaware of the replacement state flow.

According to an embodiment, at 321, the SST state flow driver provides customized state flows and screen identifiers in the replacement table for the SST. The SST part of an SST network that all use the existing state table but the SST is customized with enhanced state flows and screen identifiers.

In an embodiment of 321 and at 322, the SST state flow driver ensures state transitions from the customized state flows are consistent to existing state transitions that were present in the existing state table. In other words, the state processing that occurs between moving to a next state is handled in the normal manner that the SST would normally perform and the states code on the SST remains unchanged.

In an embodiment, at 323, the SST state flow driver provides the customized state flows as web-enabled flows that the browser can process.

In an embodiment of 323 and at 324, the SST state flow driver embeds data in the web-enabled flows that can be processed by web applications associated with the browser.

Figure 4:
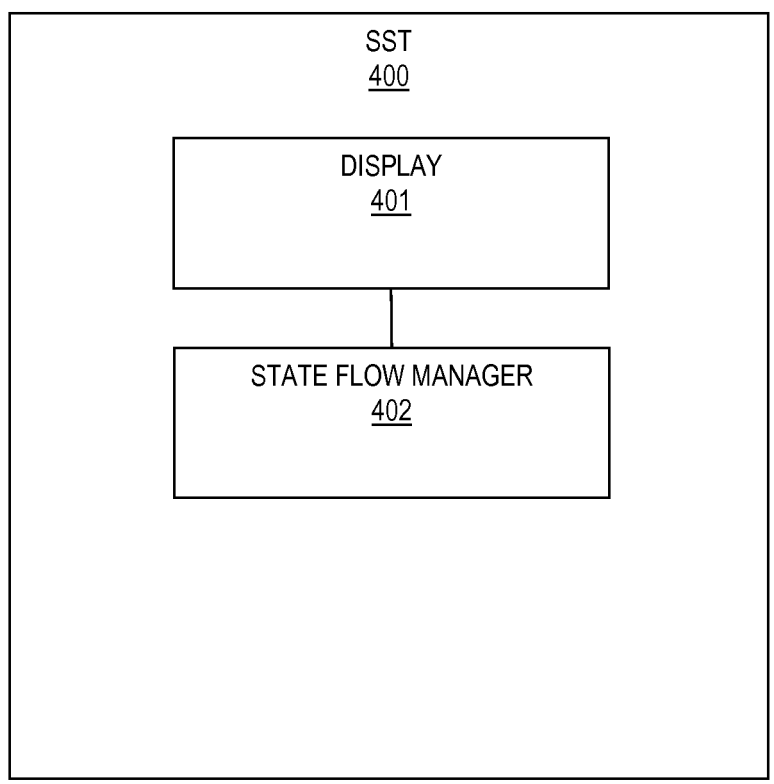
FIG. 4 is a diagram of a Self-Service Terminal, according to an example embodiment.

FIG. 4 is a diagram of a SST 400, according to an example embodiment. The SST 400 includes a variety of hardware components and software components. The software components of the SST 400 are programmed and reside within memory and/or a non-transitory computer-readable medium and execute on one or more processors of the SST 400. The SST 400 communicates over or on one or more networks, which can be wired, wireless, or a combination of wired and wireless.

In an embodiment, the SST 400 is the ATM 110 of the FIG. 1A.

In an embodiment, the SST 400 is a kiosk.

In an embodiment, the SST is a Self-Service Checkout station.

In an embodiment, the SST is a POS device.

The SST 400 includes a display 401 and a state flow manager 402.

In an embodiment, the display 401 is a touchscreen.

The state flow manager 402 is adapted and configured to: execute on the SST 400, acquire a replacement states flow for an existing state table on the SST 400, handle states flow and screens rendering to the display 401 from the replacement states flow, and call existing states code on the SST 400 during state transitions from the replacement states flow.

In an embodiment, the state flow manager 402 is the browser 114 and web applications 113 of the FIG. 1A.

In an embodiment, the state flow manager 402 is the method 200 of the FIG. 2.

Accordingly, the embodiments discussed above with respect to the FIGS. 1 and 2 are incorporated by reference herein with respect to the state flow manager 402 of the SST 400.

In an embodiment, the state flow manager 402 is further adapted and configured to render the screens as web-encoded pages.

In an embodiment, the state flow manager 402 is further adapted and configured to acquire the existing state table from a remote host during boot up or initialization of the SST 400.

In an embodiment of the last mentioned embodiment, the state flow manager 402 is further adapted and configured maintain compatibility with the remote host to process SST transactions.

In still another embodiment of the previous mentioned embodiment, the state flow manager 402 is further adapted and configured to ensure the existing states code remains unchanged.

It is to be noted that re-using existing SST or ATM states code is a significant benefit because this code can be quite voluminous. Moreover, another significant benefit of the techniques herein is maintaining compatibility with the remote host so that existing SST transactions are processed as they normally would be processed by the remote host.

So, the techniques and SST 400 presented herein and above provides an easy to deploy solution to improving states flow and screens rendering with minimal infrastructure changes. This is done with low risk because the SST transaction processing with the remote host remains unchanged and state transitions within the SST and existing states code remains unchanged. So, banks and financial institutions (in particular) will not impact mission critical operations and assume little to no risks by adopting the techniques and SST 400 presented herein, while at same time these banks and financial institutions update their SST states flow and screens rendering technologies to more state-of-the art approaches.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
dynamically and transparently obtaining a replacement state flow for an existing state table of a Self-Service Terminal (SST);
processing the replacement state flow on the SST; and
rendering a screen to a display of the SST as identified in the replacement state flow as a web-encoded document using a browser interface, wherein rendering further includes using a web-based application to one or more of: translate the screen to a different spoken language and enhance interactive features of the screen.

2. The method of claim 1 further comprising, processing the method as an enhanced browser that executes on the SST.

3. The method of claim 1, wherein dynamically and transparently obtaining further includes obtaining the replacement state flow when an existing SST application attempts to access the existing state table.

4. A method, comprising:
dynamically and transparently obtaining a replacement state flow for an existing state table of a Self-Service Terminal (SST);
processing the replacement state flow on the SST; and
calling an existing function of the SST associated with an existing state when the replacement state flow indicates a state transition.

5. A method, comprising:
dynamically and transparently obtaining a replacement state flow for an existing state table of a Self-Service Terminal (SST), wherein dynamically and transparently obtaining further includes obtaining the replacement state flow from a different external source for that which an existing application of the SST used to obtain the existing state table; and
processing the replacement state flow on the SST.

6. The method of claim 5, wherein obtaining further includes hiding the existing state table from the SST.

7. A method, comprising:
receiving a request from a web browser application processing on a Self-Service Terminal (SST); and
delivering a replacement state flow to replace an existing state table to the SST in response to the request, wherein an existing application executing on the SST or on a remote host server is unaware of the replacement state flow.

8. The method of claim 7, wherein delivering further includes providing customized state flows and screen identifiers in the replacement state flow.

9. The method of claim 8, wherein providing further includes ensuring state transitions from the customized state flows are consistent to existing state transitions that were present in the existing state table.

10. The method of claim 7, wherein delivering further includes providing the customized state flows as web-enabled flows that the web browser application can process.

11. The method claim 10, wherein providing further includes embedding data in the web-enabled flows that can be processed by web applications associated with the web browser application.

12. A Self-Service Terminal (SST), comprising:
a display; and
a state flow manager configured and adapted to: i) execute on the SST, ii) acquire replacement state flows for an existing state table on the SST, iii) handle state flows and screen rendering to the display from the replacement state flows, and iv) call existing states code on the SST during state transitions from the replacement state flows, and wherein the state flow manager is web-enabled browser.

13. The SST of claim 12, wherein the SST is an Automated Teller Machine (ATM).

14. The SST of claim 12, wherein the state flow manager is further adapted and configured, in iii), to render the screens as web-encoded pages.

15. The SST of claim 12, wherein the state flow manager is further adapted and configured, in ii), to: acquire the existing state table from a remote host during boot up or initialization of the SST.

16. The SST of claim 15, wherein the state flow manager is further adapted and configured to: v) maintain compatibility with the remote host to process SST transactions.

17. The SST of claim 16, wherein the state flow manager is further adapted and configured to: vi) ensure the existing states code remains unchanged.

* * * * *